Figure 1:
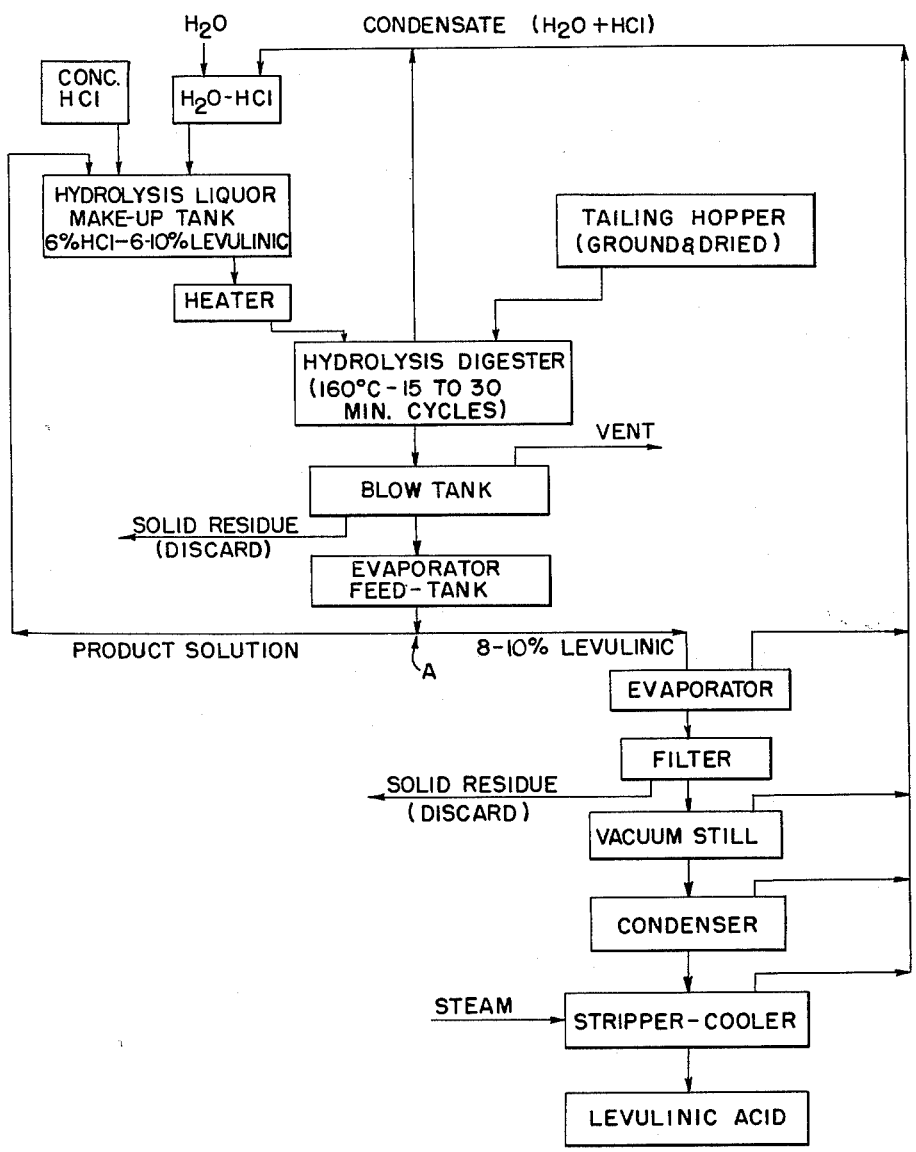

Nov. 20, 1962     L. J. CARLSON     3,065,263
PROCESS FOR THE MANUFACTURE OF LEVULINIC ACID
Filed Nov. 17, 1959     2 Sheets-Sheet 1

INVENTOR
LEWIS J. CARLSON
BY *Pennie Edmonds,*
*Morton, Barrows & Taylor*
ATTORNEYS Nov. 20, 1962     L. J. CARLSON     3,065,263
PROCESS FOR THE MANUFACTURE OF LEVULINIC ACID
Filed Nov. 17, 1959     2 Sheets-Sheet 2
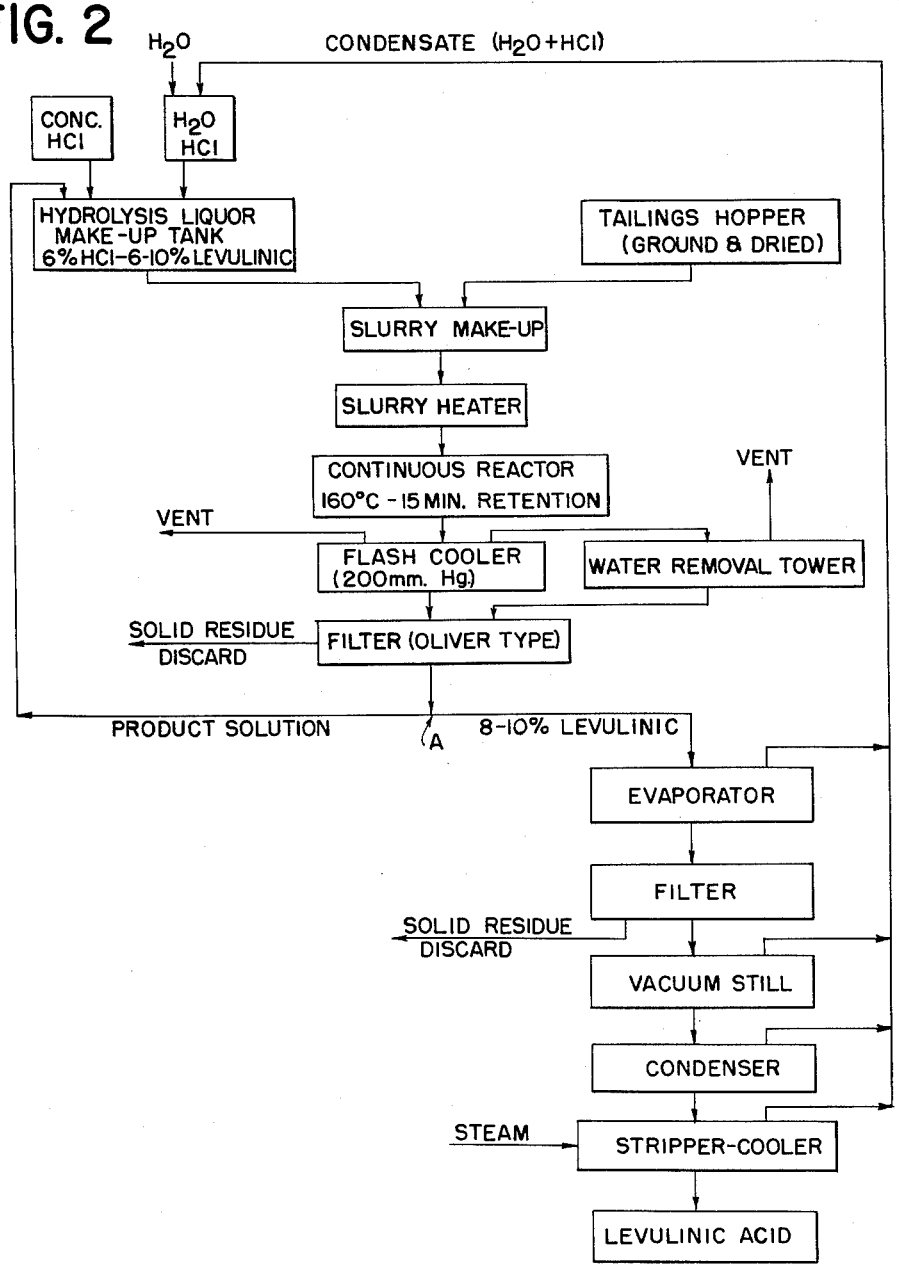

3,065,263
**PROCESS FOR THE MANUFACTURE OF
LEVULINIC ACID**
Lewis J. Carlson, Shelton, Wash., assignor to Rayonier
  Incorporated, Shelton, Wash., a corporation of Delaware
Filed Nov. 17, 1959, Ser. No. 853,572
3 Claims. (Cl. 260—528)

This invention relates to the manufacture of levulinic acid from carbohydrates by means of acid hydrolysis. More specifically, the invention provides an improved cyclic process of manufacture wherein a carbohydrate such as cellulose is hydrolyzed with a dilute mineral acid at an elevated temperature and then converted to levulinic acid.

It has long been known that carbohydrates yield levulinic acid upon acid hydrolysis at elevated temperatures, and many processes have been proposed for adapting this knowledge to commercial use. Since suitable cellulose-containing plant material is available in immense and replenishable quantities as a raw material and levulinic acid, because of its reactive keto and carboxyl groups, has many known and prospective industrial uses, one would expect there to be considerable activity in this field. Actually, such is not the case. Relatively long reaction times, coupled with problems arising from the necessity of treatment of large volumes of corrosive and dilute solutions, have kept the known processes of manufacturing levulinic acid from becoming economically attractive. As the substance of my invention, therefore, I have discovered and developed an improved cyclic process for the manufacture of this chemical that overcomes many of the disadvantages that have plagued the prior art, and which is economically attractive.

As already indicated, a number of processes have been proposed for the manufacture of levulinic acid from carbohydrates such as cellulose-containing vegetable matter. They have shown that maximum yields can be obtained by the use of relatively dilute aqueous solutions of mineral acids as catalysts at high ratios of solution to carbohydrate solid, temperatures ranging from about 120 to 200° C. and times ranging from about 1 to 10 hours. Under optimum conditions, these methods yield product solutions containing from about 1.0 to 2.0% of levulinic acid. Such dilute product solutions and high ratios of hydrolysis liquor to carbohydrate solid require a large equipment to product ratio, and since such equipment must be resistant to strong mineral acids, it is expensive. Another major item of expense that has long held back commercial development of levulinic acid as an organic chemical has been the high cost of evaporating (or extracting) and refining the dilute product solutions to recover the pure levulinic acid.

I have discovered that the presence in the hydrolysis liquor of a substantial amount (up to 6 to 10%) of levulinic acid in addition to the mineral acid catalyst is not particularly detrimental to the over-all reaction. I have also discovered that under proper reaction conditions the reaction will go to substantial completion in a fraction of the time formerly thought to be necessary. In my invention, therefore, use is made of these discoveries by providing a cyclic system of digestions for relatively short periods of time with a liquor containing from 6 to 10% of levulinic acid in addition to the usual mineral acid. Further processing conditions include the use of from 4 to 10% of HCl as catalyst, a solution to carbohydrate ratio of from about 5 to 1, to 15 to 1, a temperature within the range of about 140 to 200° C., and a time of from about 10 to 60 minutes.

In the invention, each cyclic digestion will increase the levulinic acid content of the product solution from 1.5 to 2.0%. After separation from the residual solid matter, the product solution is divided into two portions and one of these containing levulinic acid equivalent in amount to that formed in said digestion is directed to product recovery. The other portion of the product solution is recycled and used to treat fresh carbohydrate material after having added thereto water and mineral acid as needed. This cyclic process, which of course is amenable to both batch and continuous systems, can be continued indefinitely as desired. The portion of the product solution directed to product recovery in this manner will contain about 8 to 12% of levulinic acid, as contrasted with the dilute 1.0 to 2.0% solutions of the processes proposed heretofore. In addition, the shortened reaction time substantially increases the through-put of levulinic acid in a given period for a given size of equipment. From the foregoing, it is evident that my cyclic process results in substantial savings in equipment-to-product ratio, as well as in refining costs.

Any carbohydrate capable of yielding a hexose sugar upon hydrolysis can be transformed into levulinic acid by the process of the present invention. For economic reasons, however, it is practical to use only those that are inexpensive, plentiful, and require a minimum of conditioning. The tailings or screenings now discarded by the wood pulping industry and usually used as fuel are such a material. They are in comminuted form and contain a substantial amount of easily-accessible cellulose. Other materials that can be used are sawdust, waste paper, and agricultural wastes such as bagasse and black strap molasses.

Whatever type of carbohydrate is selected as a raw material, it is advantageous that it be ground or otherwise comminuted to say 5 to 10-mesh, and dried to about 90% bone-dry or drier, if not already in that form. Comminution affords uniform and complete penetration of the hydrolysis liquor in a minimum of time, leading thereby to rapid development of high yields of levulinic acid, ease of handling, etc. The pre-drying facilitates control of the make-up of recycled digestion liquors, etc.

In the preferred embodiment of my invention, I use an aqueous digestion liquor containing 6% of hydrochloric acid (HCl) as catalyst and about 8% of recycled levulinic acid. Using such a liquor, good yields are obtained with tailings in cycles as short as 15 minutes. Increasing the levulinic acid content beyond this point soon affects the yield adversely, while increasing either the HCl content or reaction time very much (other things being equal) seems to promote unwanted side reactions with the levulinic acid without substantially increasing its formation.

HCl is preferable to other mineral acids (of which sulfuric acid ($H_2SO_4$) is most commonly used) as catalyst, although they can be used. Being relatively volatile, HCl is much easier to recover and return to the system for re-use with a minimum of loss. Also, when HCl rather than the less volatile acids is the catalyst, it is simpler and less expensive to recover the levulinic acid itself from the product solution. With HCl relatively simple vacuum distillation methods are feasible. With nonvolatile acids, more cumbersome and expensive solvent extraction methods are required.

One of the major advantages of this invention is the short reaction time required to obtain a good yield of levulinic acid. The prior publications have almost uniformly taught the need for periods ranging from 1 to 10 hours. Using my preferred conditions, I have found the optimum time to vary from about 5 minutes for glucose to about 30 to 40 minutes for sawdust or high alpha cellulose pulps. As pointed out before, subdivision of the raw material to a reasonably fine mesh assists penetration and thereby shortens the treatment period. The type of carbohydrate and the ease of its hydrolysis into a hexose is also important. For example, in the case of glucose, which is already a hexose sugar, the reaction is almost instantaneous, but it takes perhaps 30 to 40 minutes to hydrolysis the more difficulty-hydrolyzable alpha pulps. Tailings which can be treated advantageously contain a considerable proportion of easily hydrolyzed hemi-celluloses which facilitate and speed up the conversion.

Temperature also affects the time required for the over-all reaction. As would be expected, the reaction goes more rapidly the higher the temperature within certain limits. After a certain temperature is reached, however, the rate at which the levulinic acid is used up in extraneous side reactions also increases. With this in mind, it becomes necessary, for practical reasons, to balance one effect against the other to arrive at an optimum temperature considering time of reaction on the one hand and over-all yield on the other. For my purposes, I have found this optimum temperature to be about 160° C. Above this temperature, the unwanted side reactions soon build up until the yield of levulinic acid suffers. Below 160° C., the rate of reaction soon begins to fall off with ever-increasing speed, thereby sharply increasing the required digestion times.

The over-all yield of levulinic acid depends upon two major factors: namely, the proportion of carbohydrate to non-carbohydrate in the raw material used, and the ratio of hydrolysis liquor to carbohydrate. A pure carbohydrate such as starch will give a greater yield than sawdust, of course, since in the latter case a large portion of the material is non-carbohydrate. Along this line, I have found the aforementioned tailings to be especially desirable because, having been cooked and reduced in size from wood chips, a portion of the non-carbohydrate components have been removed and they have a relatively-high and easily-accessible content of partially-hydrolyzed carbohydrate. Theoretically speaking, the higher the ratio of hydrolysis liquor to carbohydrate, the higher the yield of levulinic acid within reasonable limits. I have found, however, that the rate of increase in yield due to this factor falls off sharply after a certain optimum ratio is reached. Under the preferred conditions, this optimum ratio appears to be about 10 to 1, solution to carbohydrate, other things remaining equal.

Having now briefly outlined the more salient features of my invention, the preferred embodiments thereof will be illustrated in more detail in the flow sheets and examples.

FIGURE 1 illustrates a preferred batch-type embodiment of my invention. It contemplates the use of tailings that have been predried to 90 to 95% bone-dry in a direct contact hot air dryer. In starting up the operation, I prefer to recycle all the digestion liquor until its levulinic acid content builds up to approximately 10% before directing any part of it to product recovery. A digestion liquor comprising a 6% HCl solution is made up in the make-up tank and preheated to 160° C. It is then charged to the digester along with sufficient predried tailings from the hopper to form a slurry having a solution to solid ratio of 10 to 1. This slurry is maintained at 160° C. in the digester (with agitation) for 15 to 20 minutes, whereupon it is blown into an acid-impervious blow tank containing a filter (e.g., sand) and the liquid drawn off into an evaporator feed tank. The solids on the filter are discarded after being washed down with the condensate obtained by venting the digester during hydrolysis, etc. Analysis has shown the digestion to be quite complete, and all carbohydrate capable of forming levulinic acid will be found to have been substantially converted to levulinic acid.

After the first cycle, the resulting product solution will contain about 1.5 to 2.0% levulinic acid. In re-using the product solution in the second cycle, etc., mechanical losses of HCl and water must be made up before treatment of the fresh batches of carbohydrate. (If the tailings or other carbohydrate are not pre-dried, it will be necessary to evaporate some of the water from the product solution before it can be used.) After about six or seven recyclings of the product solution, it will be found to contain about 10% of levulinic acid, at which time a portion of it can be diverted to levulinic acid recovery. The product solution leaving the evaporator feed tank (point A) is then split into two streams proportioned so that one containing levulinic acid equivalent in amount to that formed in the last cycle (about 15 to 20% of the total) is directed to the evaporator, etc., for product recovery. The other stream is returned to the hydrolysis liquor make-up tank and its HCl content adjusted to 6% as before for the next cycle, etc. The complete process is now in operation and can be continued as desired, so long as the product solution is properly divided between product recovery and digestion.

Many methods are known for recovering levulinic acid from the crude product solution, and almost any of them can be used in my process without affecting the basis of the invention. For practical reasons, however, I prefer to use vacuum distillation methods as outlined in FIGURES 1 and 2, to take advantage of the volatility of the HCl. Such methods are simpler and less expensive than the extraction methods required if less volatile acid catalysts are used. In the process outlined in FIGURES 1 and 2, the crude product solution containing approximately 10% levulinic acid, some HCl, water, and various amounts of extraneous materials are passed directly into a reduced pressure evaporator (50 to 100 mm. Hg), where a major portion of the HCl and water are removed and returned to the cyclic digestion system for use in the next digestion cycle. Over-all HCl recovery for the system will be found to run between 90 and 95%. The crude levulinic acid product will leave the evaporator as a dark-brown syrup containing a small amount of extraneous solids (about 1%), which should be removed to prevent trouble in the following vacuum distillation unit. It is filtered and then vacuum-distilled, followed by vacuum steam stripping (15 mm. Hg at 90° C.), where the last traces of HCl are removed. The product emerges from the steam stripper as an amber-colored levulinic acid of from 95 to 97% purity. This is sufficient for most commercial purposes, but the purity can be raised as desired, of course, by conventional methods.

FIGURE 2 illustrates an adaptation of the invention to a continuous process with the resultant well-known advantages in uniformity of operational control and savings in time and costs. Continuous processing is particularly attractive in this case because of the difficulties attendant upon the use of such short reaction cycles at the given high temperatures.

In the continuous process, the preferred digestion liquor is a 6% HCl solution. It is made up in the make-up tank and mixed with the carbohydrate in the slurry tank to form a 10 to 1 liquor-to-carbohydrate slurry. The slurry is heated to 160° C. in a jacketed exchange heater and passed into a reaction unit composed of a heated retention conduit of sufficient length to provide 15 minutes retention time. Pressure in the retention unit should be maintained at about 100 p.s.i.g., preferably by automatically regulated throttling of the discharge of the reacted material into the flash cooler.

As the levulinic acid enriched mixture emerges from the retention unit, it is discharged into a flash cooler (preferably at a reduced pressure of about 200 mm. Hg) and cooled to 70 to 75° C. Vapor flashed off at this point is condensed and used to wash the solids as they are separated out in the filter stage. Any type of filter capable of handling the material can be used, but I prefer an Oliver-type continuous unit with acid-proof screens. Whatever type filter is used, however, the solid residue is discarded and the product solution directed to product recovery and digestion. I have found that using predried tailings, the water input of the entire system can be largely balanced in the filter stage by the loss with the discarded tailings residue.

In starting up the continuous embodiment of the invention, all of the product solution from the filter is recycled to the hydrolyzing liquor make-up tank for re-use until its content of levulinic acid reaches about 10%. When this point is reached, the product solution is split into two streams, one of which is directed to levulinic acid recovery and the other to digestion liquor make-up. The division should be made in such a ratio that the levulinic acid content of the product solution emerging from the filter (point A) is maintained at approximately 10% at all times. This means directing from 15 to 20% of the total production solution to product recovery, depending on the efficiency of conversion in the digester, and recycling the remainder. The same general method of product recovery from the product solution can be used in this case as in the batch system with a few modifications that will be obvious to one skilled in the art.

EXAMPLE I

This example illustrates the effect of time of hydrolysis on yield of levulinic acid as determined chromatographically for a single cycle of hydrolysis. The carbohydrate used was a large sample of tailings from a sulfite pulp mill processing southern pine, and came from the knotter reject screens. The tailings had a cellulose content slightly 60% and were dried to approximately 95% bone-dry in a 100° C. forced air circulation drying oven.

In the hydrolysis, 100 parts of a 6% aqueous HCl solution and 10 parts of tailings were placed in a tantalum metal-lined tumbling autoclave and brought to 160° C. (about 15 minutes) as rapidly as possible and then held at that temperature for the indicated times. (The amount of levulinic acid formed during the warming-up period is designated as the 0 value in the table.) At the conclusion of the indicated time of hydrolysis, the autoclave was rapidly cooled and the contents removed. The yield of levulinic acid based on the bone-dry weight of the tailings used was then determined by column chromatography. The results follow in Table I.

*Table I*

| Time in minutes | Percent levulinic acid (based on weight of tailings) |
| --- | --- |
| 0 | 10.3 |
| 15 | 19.0 |
| 30 | 23.1 |
| 60 | 23.2 |
| 90 | 22.8 |
| 120 | 20.5 |

From the foregoing results, it will be noted that using tailings there is little point in continuing the hydrolysis beyond about 15 minutes at the given temperature as the rate of increase of yield starts to level off rapidly at that point. In fact, it will be noted that if the hydrolysis is continued too long, the yield starts to go down again as the result of side reactions of the levulinic acid.

EXAMPLE II

This example illustrates the utility of treating various types of carbohydrate containing materials in the process of the invention. Samples of a high-alpha cellulose dissolving pulp, Baker's anhydrous dextrose (glucose) and of several kinds of wood, with and without bark, were each prepared and hydrolyzed in the same manner and in the same equipment as the tailings in Example I. In each case, the hydrolyzing liquor was an aqueous 6% HCl solution and the liquor-to-solid ratio was 10 to 1. The wood samples were Wiley-milled to a coarse mesh and dried to 95% bone-dry before hydrolysis. Yields of levulinic acid were again determined by column chromatography.

*Table II*

| Carbohydrate | Hydrolysis time, minutes | Yield of levulinic acid, percent (based on raw materials) |
| --- | --- | --- |
| Dissolving pulp | 30 | 36.2 |
| Do | 60 | 40.5 |
| Do | 90 | 39.4 |
| Do | 120 | 37.4 |
| Do | 150 | 33.8 |
| Glucose | 15 | 41.4 |
| Do | 30 | 40.8 |
| Do | 60 | 36.5 |
| Water oak (with bark) | 30 | 13.0 |
| Water Oak (without bark) | 30 | 18.4 |
| Black gum (with bark) | 30 | 15.3 |
| Black Gum (without bark) | 30 | 16.6 |
| Cypress (with bark) | 30 | 15.3 |
| Cypress (without bark) | 30 | 17.9 |

From the foregoing, it may seem that the yields of levulinic acid obtained for the tailings of Example I and wood samples in this example are low when compared with those obtained for the dissolving pulp and the glucose. Yields based on actual carbohydrate contents, however, will be found to be surprisingly close. Only about 60% of the tailings is a carbohydrate (cellulose and hemicellulose), and the proportion is even lower for the wood samples, especially when the bark is not removed. Dissolving pulp, on the other hand, is almost entirely carbohydrate material (alpha-cellulose), and glucose is a pure carbohydrate.

It will be noted that, as previously indicated, the type of carbohydrate exerts considerable effect on the optimum hydrolysis time to be used. For example, conversion of glucose to levulinic acid is complete in much less than 15 minutes. Tailings which contain a fair proportion of easily-hydrolyzable hemicelluloses provide an optimum yield in 15 to 30 minutes, while dissolving pulp, with its more difficultly-hydrolyzable alpha-cellulose, requires around 60 minutes. It is upon this basis that I prefer the tailings as a source of carbohydrate over other waste products. On the other hand, glucose is an ideal source from a purely operational standpoint, but economically unattractive.

EXAMPLE III

This example illustrates how the levulinic acid content of the product solution, as obtained by the cyclic process of the invention, can be built up to about 10% before the efficiency of the reaction begins to fall off substantially. A large sample of tailings from a southern pine sulfite mill was divided into 30 portions. A hydrolysis digestion liquor was made up containing 6% HCl in aqueous solution and was used to digest a portion of the tailings at a hydrolysis liquor to carbohydrate ratio of 10 to 1 at 160° C. The product solution thus formed was then used to digest a second portion of tailings, etc., after being made up to volume and concentration with water and HCl. Three series of ten cyclic digestions were made in this manner, using cooking times of 15, 30 and 60 minutes. The results are given in Table III. The levulinic acid content of the various product solutions was determined chromatographically.

Table III

PERCENT LEVULINIC ACID IN PRODUCT SOLUTION ON RECYCLING ALL OF THE HYDROLYSIS LIQUOR

| Cycle No. | Series (cycle time, mins.) | | |
|---|---|---|---|
| | 1 (15) | 2 (30) | 3 (60) |
| | Percent levulinic acid | | |
| 1 | 1.8 | 2.0 | 2.4 |
| 2 | 2.9 | 3.3 | 4.1 |
| 3 | 4.3 | 4.8 | 5.7 |
| 4 | 6.0 | 6.6 | 6.9 |
| 5 | 7.1 | 7.4 | 8.6 |
| 6 | 8.2 | 9.2 | 9.7 |
| 7 | 10.0 | 10.1 | 10.0 |
| 8 | 11.9 | 10.9 | 10.6 |
| 9 | 12.3 | 11.9 | 11.1 |
| 10 | 12.4 | 11.8 | |

From the foregoing results, it will be noted that the levulinic acid content builds up rather steadily until it reaches a value of about 10%, whereupon it begins to level off quite sharply. It will be further noted that no advantage is obtained by the longer hydrolysis times when using tailings after four or five cycles.

I claim:

1. The process of producing levulinic acid from a carbohydrate material which comprises reacting a hexose-yielding carbohydrate material with an acid solution containing from 4 to 10% by weight of a mineral acid of the group consisting of hydrochloric acid and sulfuric acid in the presence of from 6 to 10% by weight of levulinic acid and which is in the weight proportion to the carbohydrate material of between 5 to 1 and 15 to 1 at a temperature of from 140° to 200° C. for from 5 to 60 minutes, cooling the reacted mass, and separating the liquid from the solid residue, dividing the liquid containing the catalyst and levulinic acid separated from said residue into two parts, adding to one divided part of liquid such amounts of said mineral acid and water as to form said first-mentioned acid solution combining this part of divided liquid and added mineral acid and water with additional carbohydrate material and subjecting the combined material to hydrolysis, and recovering levulinic acid from the other divided part.

2. In the process of claim 1, using wood pulp tailings as the carbohydrate material.

3. The cyclic process of producing levulinic acid from carbohydrate material which comprises subjecting a hexose-yielding carbohydrate material to the hydrolyzing action of a dilute hydrochloric acid solution, said hydrochloric acid solution containing from 4 to 10% by weight of hydrochloric acid and from 6 to 10% by weight of recycled levulinic acid and being a weight proportion to carbohydrate material of between 5 to 1 and 15 to 1, heating the mass of acid solution, levulinic acid and carbohydrate to a temperature of from 140° C to 200° C., holding the mass at this temperature for from 5 to 60 minutes, cooling the mass and separating the product liquid from the solid residue, discarding the solid residue, dividing the product liquid into two portions, recycling one portion of sufficient volume that upon adding hydrochloric acid and water as needed to bring it up to proper volume and acid concentration for recycling it will contain from 6–10% by weight of recycled levulinic acid as in the previous cycle, adding new carbohydrate material to the recycling portion, subjecting this combined recycling portion and new carbohydrate material to hydrolysis, and taking the other portion of the product liquid and separating the levulinic acid from it.

References Cited in the file of this patent

UNITED STATES PATENTS 2,813,900     Dunlop et al. _____ Nov. 19, 1957

UNITED STATES PATENT OFFICE
CERTIFICATE OF CORRECTION

Patent No. 3,065,263            November 20, 1962

Lewis J. Carlson

It is hereby certified that error appears in the above numbered patent requiring correction and that the said Letters Patent should read as corrected below.

Column 3, line 15, for "hydrolysis" read -- hydrolyze --; same line 15, for "difficulty" read -- difficultly --; column 5, line 40, after "slightly" insert -- over --; column 7, Table III, last column thereof, opposite "7", for "10.0" read -- 10.3 --.

Signed and sealed this 30th day of April 1963.

SEAL)
Attest:

ERNEST W. SWIDER            DAVID L. LADD
Attesting Officer            Commissioner of Patents